United States Patent [19]

Kobayashi

[11] Patent Number: 5,140,689

[45] Date of Patent: Aug. 18, 1992

[54] DATA RECOVERY SYSTEM AND METHOD OF DISTRIBUTED TRANSACTION PROCESSING SYSTEM

[75] Inventor: Seiichi Kobayashi, Kodaira, Japan

[73] Assignee: Kabushiki Kaisha Toshiba, Kawasaki, Japan

[21] Appl. No.: 528,201

[22] Filed: May 23, 1991

[30] Foreign Application Priority Data

May 25, 1989 [JP] Japan .................. 1-131855

[51] Int. Cl.$^5$ ............................................. G06F 11/14
[52] U.S. Cl. ............................ 395/575; 371/12; 364/282.4; 364/285.2; 364/DIG. 1
[58] Field of Search ............. 364/200, 900, 282.1, 364/282.4, 285.2; 371/12

[56] References Cited

U.S. PATENT DOCUMENTS

| | | | |
|---|---|---|---|
| 4,648,031 | 3/1987 | Jenner | 364/200 |
| 4,819,159 | 4/1987 | Shipley et al. | 364/200 |
| 4,868,744 | 9/1989 | Reinsch et al. | 364/200 |
| 4,897,781 | 1/1990 | Chang et al. | 364/200 |
| 5,046,002 | 9/1991 | Takashi et al. | 364/200 |

Primary Examiner—Charles E. Atkinson
Attorney, Agent, or Firm—Finnegan, Henderson, Farabow, Garrett and Dunner

[57] ABSTRACT

In a distributed transaction processing system of a two-phase commit scheme, a client sequentially requests all the servers to perform PHASE I processing. When all the servers complete the PHASE I processing, the client stores data indicating the completion of the processing. When an operation is restarted after a system down of a given server, the server inquires of the client whether all the servers have completed the PHASE I processing. If all the servers have completed the PHASE I processing, the server executes PHASE II processing. If not all the servers have completed the PHASE I processing, the server in which failures occur, causing abnormal system termination performs rollback processing, and the client requests other servers which have completed the PHASE I processing to perform rollback processing.

8 Claims, 6 Drawing Sheets

DATA RECOVERY SYSTEM AND METHOD OF DISTRIBUTED TRANSACTION PROCESSING SYSTEM

BACKGROUND OF THE INVENTION

1. Field of the Invention

The present invention relates to a data recovery system and method of a distributed transaction processing system in which a plurality of data processing systems serving as servers or clients are connected to each other through a communication line and, more particularly, to a data recovery system of a distributed transaction processing system wherein when a given server falls in a system down during transaction completion processing, and an operation is restarted, data recovery can be realized while matching of transaction data between the given server and other servers is maintained.

2. Description of the Related Art

Distributed processing systems are known as systems in which processors having computing functions, auxiliary memories capable of storing a large amount of data, and the like are distributed and can closely communicate with each other through a communication line. Of the distributed processing systems, a distributed transaction processing system of a two-phase commit scheme is known. In this system, a plurality of transaction files are distributed in a plurality of data processing systems serving as servers, and transaction processing is performed in response to a processing request from a data processing system serving as a client. A general operation of distributed processing of such a distributed transaction processing system will be described below.

For the sake of a simple description, assume that one client-side data processing system (to be simply referred to as a client hereinafter) is connected to a data processing system serving as a first server (to be referred to as a server A hereinafter) and a data processing system serving as a second server (to be referred to as a server B hereinafter) through a communication line.

The client accesses a transaction file of the server A in accordance with an application program, and performs predetermined transaction processing. Then, the client accesses a transaction file of the server B, and similarly performs transaction processing. Upon completion of the transaction processing, the client sequentially outputs transaction completion processing requests to the servers A and B. In this case, the client outputs the transaction completion processing requests to the servers A and B in accordance with the two-phase commit scheme. More specifically, the client requests the server A to perform PHASE I processing. In response to the PHASE I processing request, the server A updates the data, i.e., writes the contents of a data buffer in a data file, and subsequently informs the client of the completion of the PHASE I processing. In response to this completion information, the client requests the server B to perform PHASE I processing. Similarly, in response to the PHASE I processing request, the server B updates the data, and subsequently informs the client of the completion of the PHASE I processing. Upon reception of the PHASE I processing completion information from the server B, the client outputs a PHASE II processing request to the server A. In response to the PHASE II processing request, the server A discards journal data indicating an intermediate result of transaction processing recorded in a rollback journal file, and performs release processing of an exclusive resource. That is, the server A performs processing for allowing updating of transaction data which has been locked to perform rollback processing. Rollback processing is performed to cancel previous transaction processing in accordance with journal data recorded in the rollback journal file when a server falls in a system down during transaction completion processing, thereby allowing data recovery. Updating of data must be inhibited until transaction completion processing is completed because of the possibility of this rollback processing. Upon completion of the PHASE II processing, the server A outputs a PHASE II completion information to the client.

In response to the PHASE II completion information, the client outputs a PHASE II processing request to the server B. In response to the PHASE II processing request, the server B performs the above-described journal discard and release processing of updated data. After the completion of the processing, the server B outputs a completion information to the client. The client receives the completion information from the server B and determines that the transaction completion processing is completed.

Assume that the server A has completed the PHASE I processing and the server B falls in a system down during the execution of the PHASE I processing. In this case, the server B cannot determine a specific step to which the transaction completion processing has been completed by the server A. Therefore, in rollback processing, the server B cannot know a specific step to which it should roll back to maintain matching of transaction data with respect to the server A, and data matching cannot be realized between the servers A and B.

SUMMARY OF THE INVENTION

It is an object of the present invention to provide a data recovery system and method of a distributed transaction processing system, in which when a given server falls in a system down during transaction completion processing, matching of transaction data between the given server and other servers is attained when an operation is restarted, regardless of the timing of system down.

According to the first aspect of the present invention, there is provided a data recovery system of a distributed transaction processing system of a two-phase commit scheme, in which a plurality of data processing systems serving as server systems or client systems are connected to each other through a communication line, each of the data processing systems, comprising: storage means for storing status data indicating whether transaction completion processing of all the data processing systems is completed; data recovery processing processing means for performing data recovery processing on the basis of the status data stored in the storage means when an operation is restarted after a system down; and control means for, while the data processing system serves as a client system, causing the storage means to store status data indicating whether transaction processing of each of the server systems is completed, and for, while the data processing system serves as a server system, performing data recovery processing on the basis of the status data stored in the storage means by controlling the data recovery processing means when an operation is restarted after a system down of the server system.

According to the second aspect of the present invention, there is provided a data recovery method of a distributed transaction processing system of a two-phase commit scheme, in which data processing systems serving as server systems are connected to a data processing system serving as a client system through a communication line, and each of the server systems performs PHASE I processing and PHASE II processing in response to transaction processing requests from the client system, comprising the steps of: (a) holding data indicating whether all the server systems have completed the PHASE I processing; (b) inquiring of the client system whether all the server systems have completed the PHASE I processing when an operation is restarted after a system down of the server system; and (c) causing the server system to perform the PHASE II processing when response data with respect to the inquiry indicates that all the server systems have completed the PHASE I processing, and causing the server system to perform rollback processing when the response data indicates that not all the server systems have completed the PHASE I processing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

Figure 1:
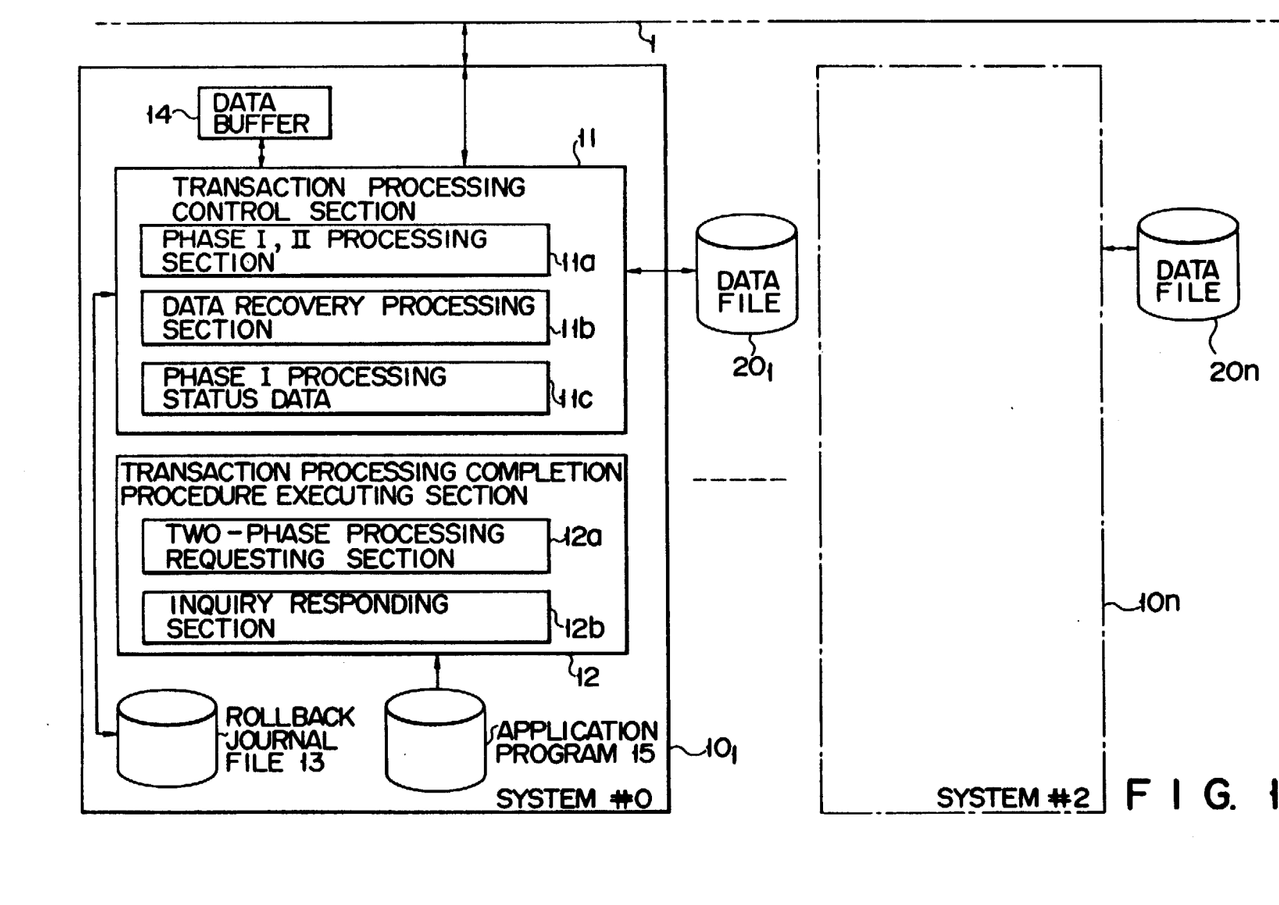
FIG. 1 is a block diagram showing a data recovery system of a distributed transaction processing system according to an embodiment of the present invention.

FIG. 1 is a block diagram showing a data recovery system of a distributed transaction processing system according to an embodiment of the present invention.

Referring to FIG. 1, a plurality of data processing systems 10 are connected to each other through a communication line 1 so as to constitute a distributed transaction processing system. Each data processing system serves as a server or a client in accordance with an application. Data processing systems serving as a server and a client will be simply referred to as a server and a client, respectively, hereinafter. Each data processing system $10i$ ($i=1, 2, \ldots n$) includes a transaction processing control section 11, a transaction processing completion procedure executing section 12, a data buffer 14, a rollback journal file 13, and an application program file 15.

The data buffer 14 temporarily stores updated data with respect to a transaction file transmitted from, e.g., a client. The transaction processing control section 11 includes a section 11a for executing PHASE I processing and PHASE II processing, a section 11b for performing data recovery processing, and a section 11c for storing status data indicating whether all servers have completed the PHASE I processing.

The transaction processing completion procedure executing section 12 includes a section 12a for requesting two-phase processing, and a section 12b for inquiring whether all the servers have completed the PHASE I processing.

The rollback journal file 13 stores an intermediate result of transaction processing. When rollback processing is performed, an intermediate result of transaction processing which has been stored in the rollback journal file is deleted. The application program file 15 stores various application programs for transaction processing. A data file 20 is an external storage, such as a disk unit, for storing transaction data. PHASE I processing is performed to actually update data, more specifically to write updated data, which is stored in the data buffer 14, in the data file 20 (to be described later). PHASE II processing is performed to discard journal data stored in the rollback journal file 13 and to perform release processing of updated data (an exclusive resource).

An operation of the data recovery system of the distributed transaction processing system shown in FIG. 1 will be described below with reference to FIGS. 2 through 5.

Figure 2:
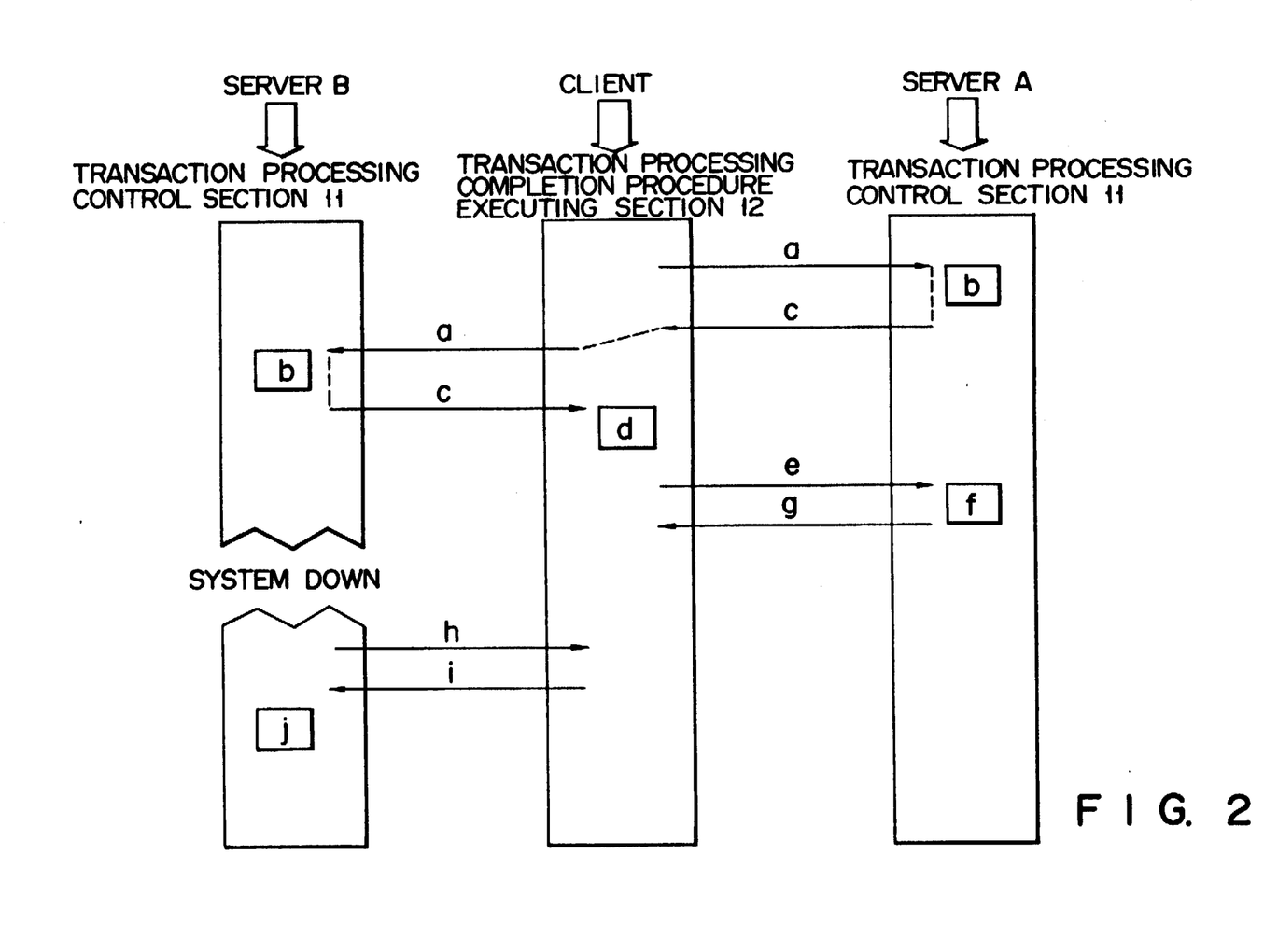
FIG. 2 is a view showing a procedure to be employed when a system down occurs after the completion of first phase processing.
Figure 3:
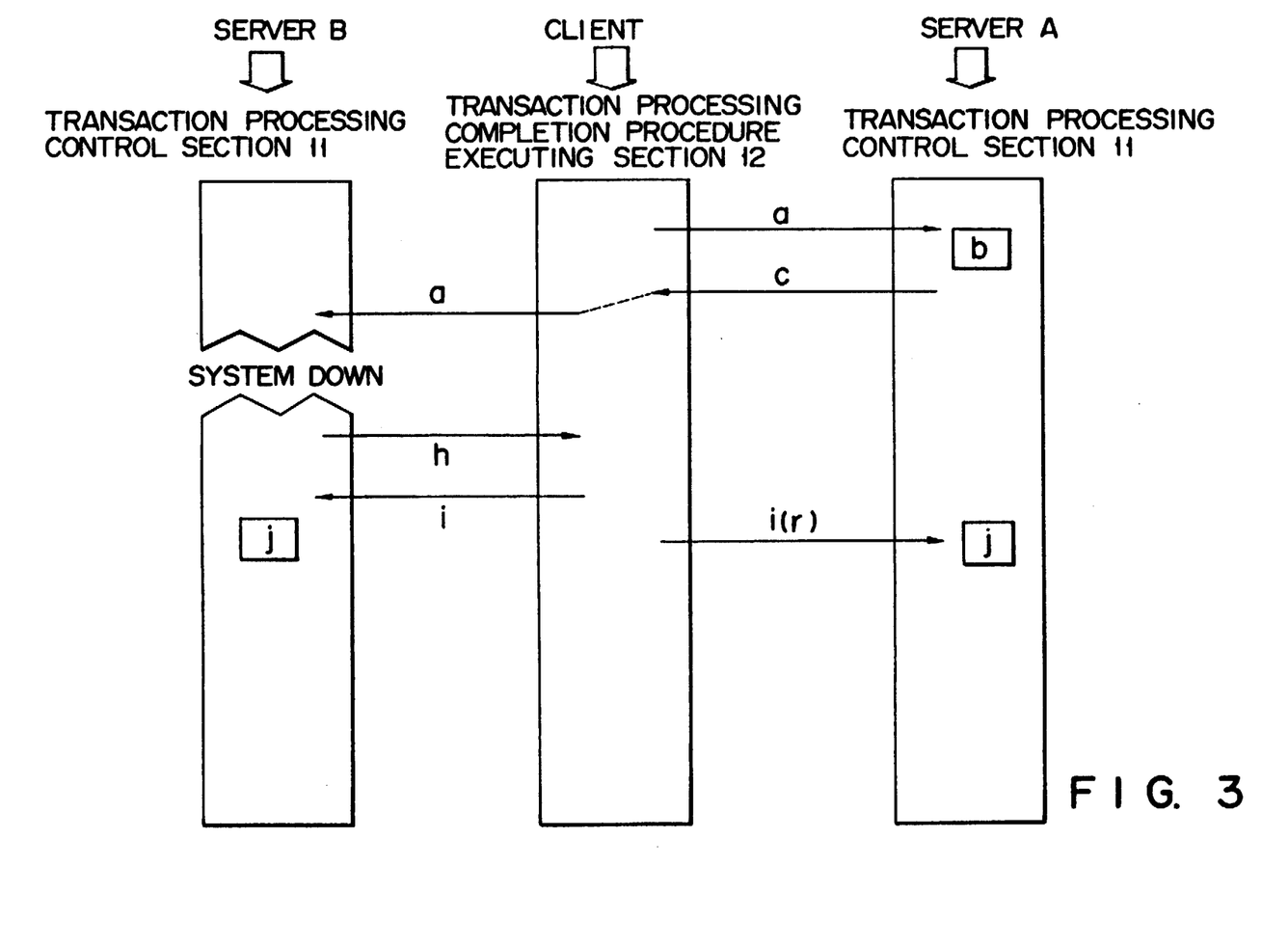
FIG. 3 is a view showing a procedure to be employed when a system down occurs before the completion of first phase processing.

FIGS. 2 and 3 schematically show procedures in the embodiment of the present invention. More specifically, FIG. 2 shows a procedure to be employed when a system failure occurs after the completion of the PHASE I processing. FIG. 3 shows a procedure to be employed when a system failure occurs before the completion of the PHASE I processing.

Referring to FIG. 2, the two-phase processing requesting section 12a of the transaction processing completion procedure executing section 12 of a client requests the transaction processing control section 11 of a server A to perform the PHASE I processing. The phase I, II processing section 11a of the transaction processing control section 11 of the server A performs buffer flush out processing, i.e., writes the contents of the data buffer 14 and the rollback journal file 13 in the data file 20, and writes completion data, which indicates that the PHASE I processing is completed, in the data file 20. In step c, the section 11a of the server A informs the client of the completion of the PHASE I processing. The section 12a of the client then requests the transaction processing control section 11 of a server B to perform the PHASE I processing. In response to this request, the section 11a of the server B performs buffer flush out processing and informs the client of the completion of the PHASE I processing in the same manner as in the server A. Upon reception of the completion information of the PHASE I processing from all the servers, the transaction processing control section 11 of the client stores PHASE I processing status data in the PHASE I processing status data storage section 11c.

Subsequently, the section 12a of the client requests the transaction processing control section 11 of the server A to perform the PHASE II processing. In response to this request, the section 11a of the server A performs the PHASE II processing, i.e., discards a journal file stored in the rollback journal file 13 and performs release processing of updated data. The transaction processing control section 11 of the server A stores data indicating the completion of the PHASE II processing in the data file 20 and transmits status data indicating that the PHASE II processing is completed. As a result, the transaction processing completion procedure executing section 12 of the client determines that the PHASE II processing has been completed, and requests the server B to perform the PHASE II processing. Assume, as shown in FIG. 2, that failures occur in the server B which cause abnormal termination of the system at this time.

When an operation is to be restarted after the system down, the data recovery processing section 11b of the server B inquires of the transaction processing completion procedure executing section 12 of the client in step h whether all the servers have completed the PHASE I processing. The inquiry responding section 12b of the client refers to the PHASE I processing status data memory 11c and transmits data indicating the completion of the PHASE I processing to the transaction processing control section 11 of the server B. The section 11b of the server B determines that all the servers have completed the PHASE I processing, and executes the PHASE II processing without performing rollback processing.

A case wherein a system failure occurs before a server completes the PHASE I processing will be described below with reference to FIG. 3.

Referring to FIG. 3, the two-phase processing requesting section 12a of the transaction processing completion procedure executing section 12 of the client requests the transaction processing control section 11 of the server A to perform the PHASE I processing. In response to this request, the section 11a of the server A executes the PHASE I processing in stage b, and returns the completion information of the PHASE I processing to the transaction processing completion procedure executing section 12 of the client. Similarly, the section 12a of the client then requests the control section 11 of the server B to perform the PHASE I processing. Assume that failures occur in the server B which cause the abnormal termination of the system at this time. In this case, when an operation is to be restarted after the system failure, the data recovery processing section 11b of the server B inquires of the transaction processing completion procedure executing section 12 of the client whether all the servers have completed the PHASE I processing. In response to this inquiry, the inquiry responding section 12b of the transaction processing completion procedure executing section 12 transmits data indicating that not all the servers have completed the PHASE I processing to the server B in step i. As a result, the data recovery processing section 11b of the transaction processing control section 11 of the server B determines that the PHASE I processing has not been completed, and performs rollback processing. That is, the section 11b cancels the previous transaction processing in accordance with the journal data stored in the rollback journal file 13. As a result, the corresponding transaction is executed from its initial processing. In addition, the section 12a of the transaction processing completion procedure executing section 12 of the client requests a server which has completed the PHASE I processing to perform rollback processing.

Figure 4A:
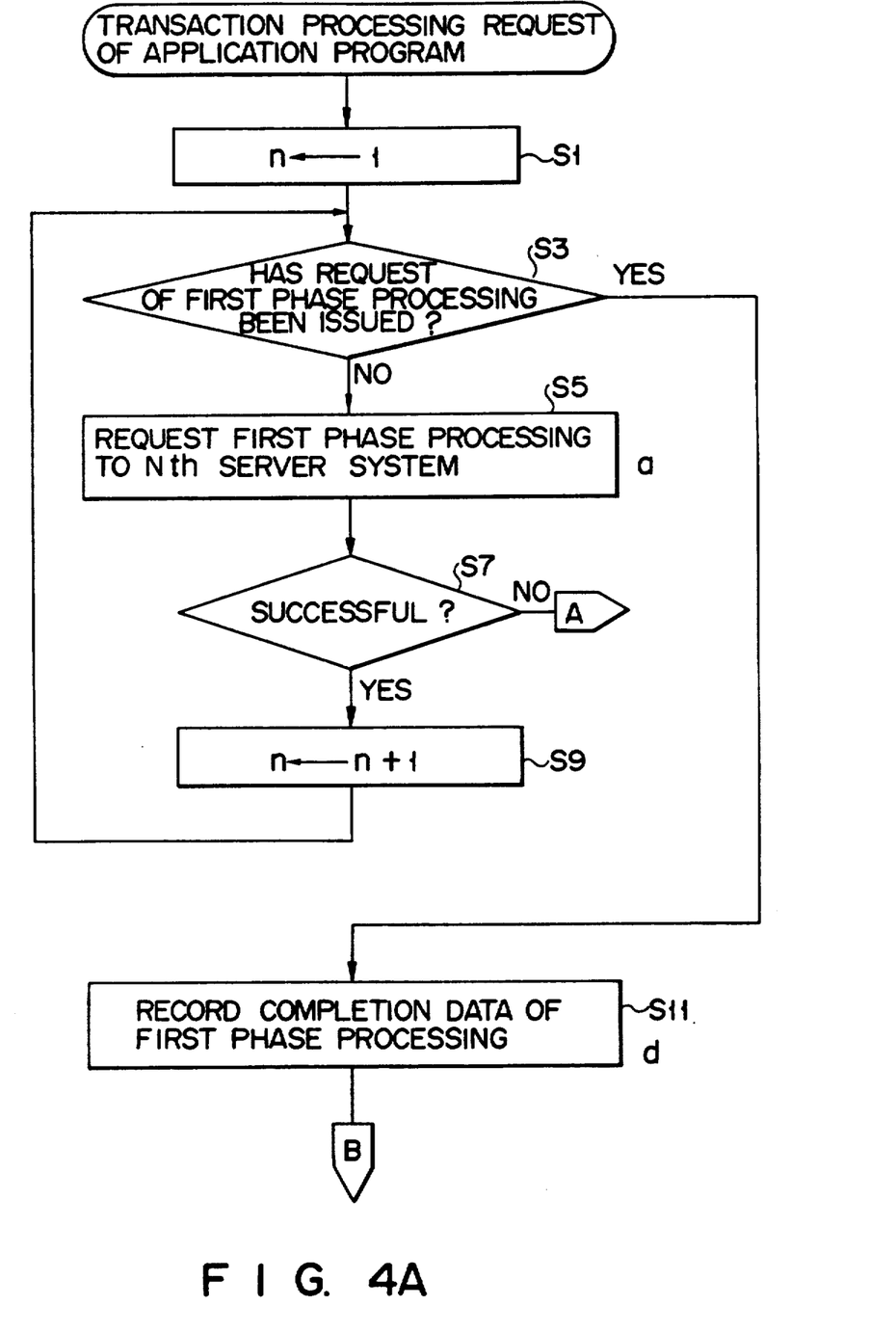
FIGS. 4A through 4C are flow charts showing an operation of a client.
Figure 4B:
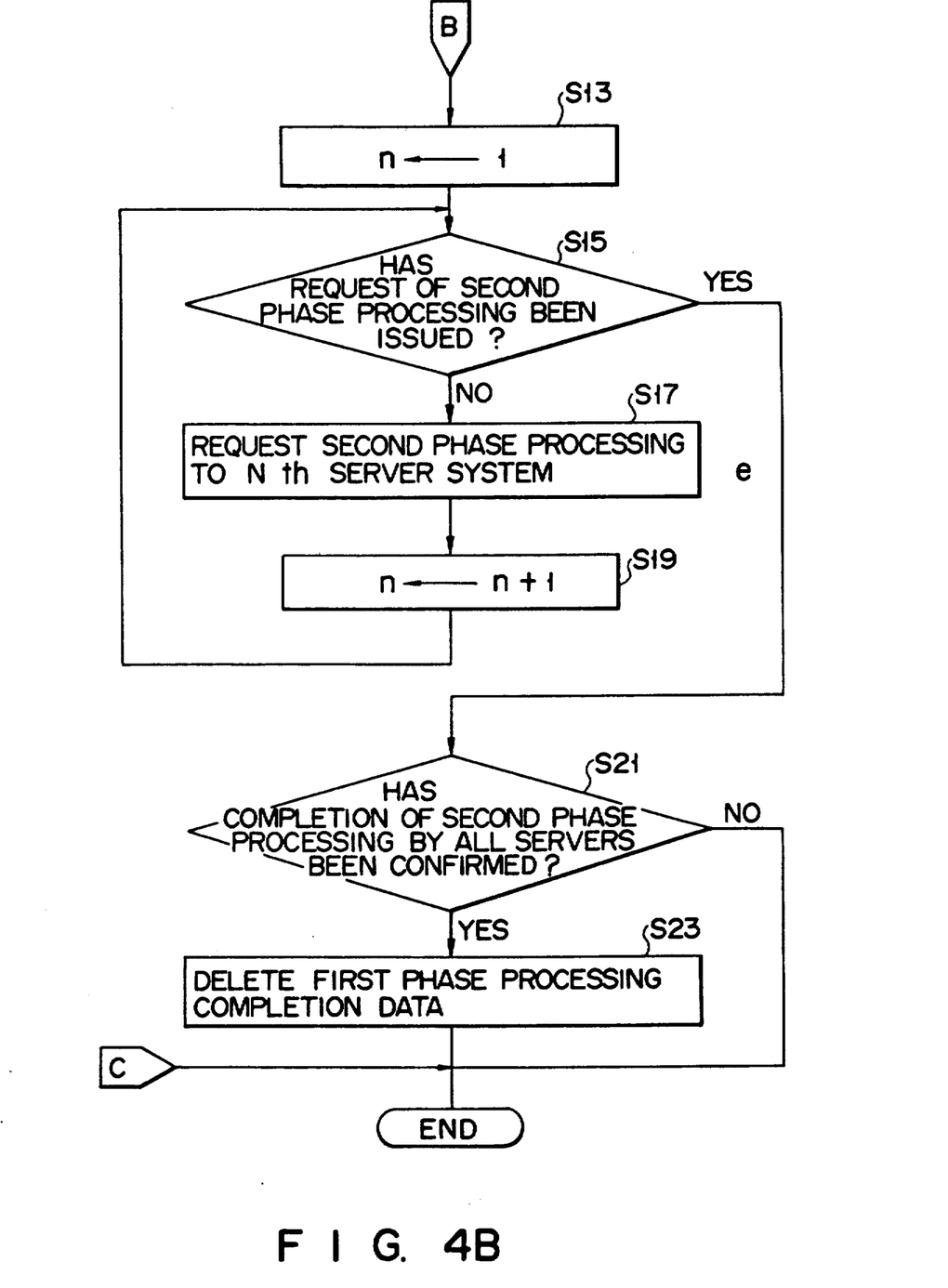
Figure 4C:
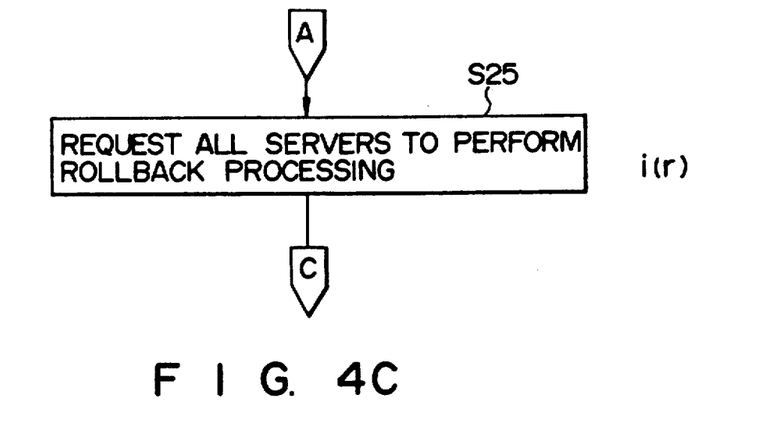

FIGS. 4A through 4C are flow charts showing an operation of a client. Referring to FIGS. 4A through 4C, reference symbols a, d, e, i (r), h, i, and j respectively correspond to those in FIGS. 2 and 3.

In step S1, a variable n indicating a server number is set to be "1". In step S3, it is checked whether the transaction processing completion procedure executing section 12 has issued requests of the PHASE I processing to all the servers. If NO in step S3, the transaction processing completion procedure executing section 12 of the client requests an nth server to perform the PHASE I processing in step S5. If it is determined in step S7 that the PHASE I processing is successful, i.e., completed, the variable n is incremented by one in step S9, and the processing from steps S3 to S9 is executed.

If NO in step S7, the transaction processing completion procedure executing section 12 of the client requests all the servers to perform rollback processing in step S25.

If it is determined in step S3 that the PHASE I processing requests are issued to all the servers, status data indicating that all the servers have completed the PHASE I processing is stored in the data storage section 11c in step S11. In Step S13, the variable n is set to be "1" again. In step S15, it is checked whether requests of the PHASE II processing have been issued to all the servers. In NO in step S15, a request of the PHASE II processing is issued to the nth server in step S17. In step S19, the variable n is incremented by one, and the processing from steps S15 to S19 is executed again. If YES in step S15, it is checked in step S21 whether all the servers have completed the PHASE II processing. If YES in step S21, the PHASE I processing completion data supplied from all the servers and stored in the storage section 11c are deleted. With this operation, the transaction processing based on an application program is completed.

Figure 5:
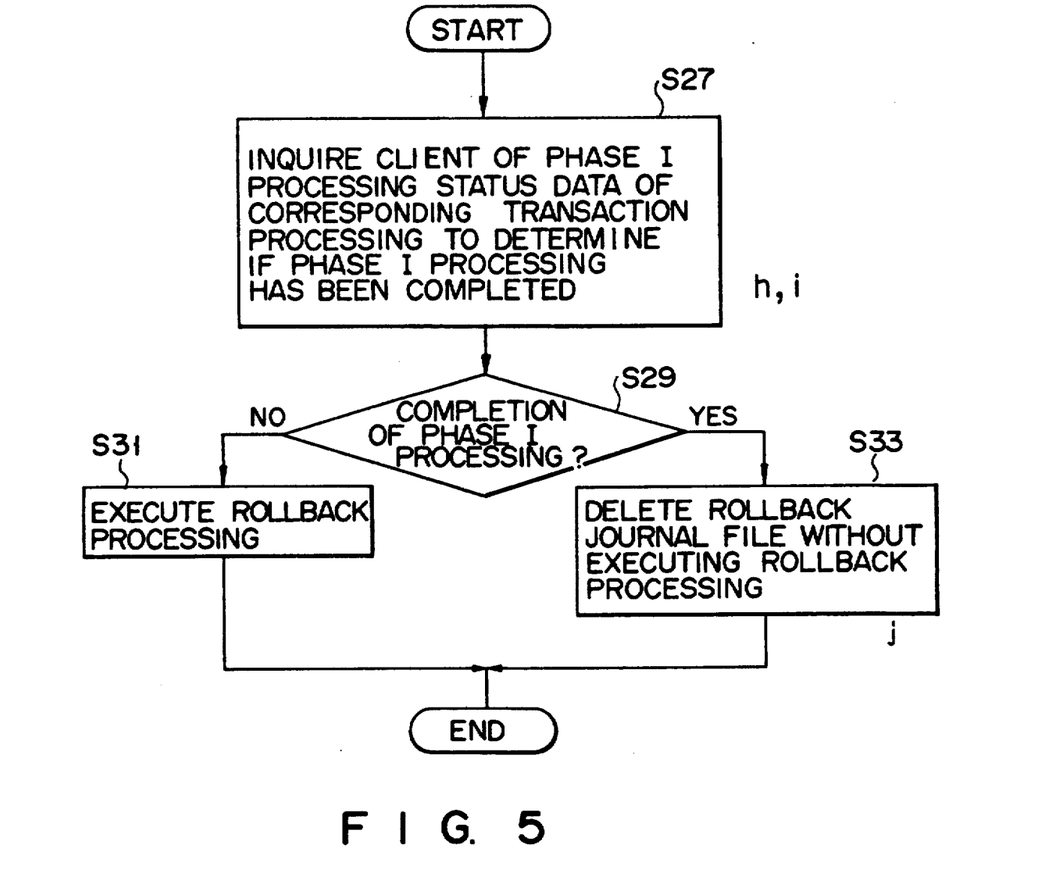
FIG. 5 is a flow chart showing an operation of a server.

An operation of a server will be described below with reference to FIG. 5.

In step S27, a server inquires of the client whether all the servers have completed the PHASE I processing. If it is determined in step S29 that the PHASE I processing has been completed, the contents of the rollback journal file are deleted without performing rollback processing in step S33. If NO in step S29, rollback processing is performed in step S31.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A data recovery system of a distributed transaction processing system of a two-phase commit scheme, in which data processing systems serving as server systems are connected to a data processing system serving as a client system through a communication line, and each of said server systems performs PHASE I processing and PHASE II processing in response to transaction processing requests from said client system, comprising:

means for issuing a transaction completion processing request from said client system to each of said server systems;

two-phase processing means for performing the PHASE I processing and the PHASE II processing in response to the transaction completion processing request, and outputting to said client system transaction processing status data indicating whether the processing has been completed;

storage means for receiving and storing said transaction processing status data from said two-phase processing means for each of said server systems;

means for inquiring of said client system the transaction processing status data output from said two-phase processing means and stored in said storage means when an operation is resumed after a system failure of said server system; and means for performing data recovery processing when the status data indicates that the transaction completion processing of said server has not been completed.

2. A system according to claim 1, wherein said storage means includes means for storing said transaction processing status data for each of said server systems and for each of the PHASE I processing.

3. A system according to claim 2, wherein when failures occur in said server system, which cause abnormal termination of the system after the PHASE I processing of all said server systems is completed, status data indicating that all said server systems have completed the PHASE I processing is received from said client system after an operation is resumed, and the PHASE II processing is performed.

4. A system according to claim 2, wherein when failures occur in said server system, which cause abnormal termination of the system before the PHASE I processing of all said server systems is completed, status data indicating that not all said server systems have completed the PHASE I processing is received from said client system after an operation is resumed, rollback processing is performed, and said client system requests said server systems which have completed the PHASE I processing to perform rollback processing.

5. A data recovery system of a distributed transaction processing system of a two-phase commit scheme, in which a plurality of data processing systems serving as server systems or client systems are connected to each other through a communication line, each of said data processing systems, comprising:

storage means for storing status data indicating whether transaction completion processing of all said data processing systems is completed;

data recovery processing processing means for performing data recovery processing on the basis of the status data stored in said storage means when an operation is restarted after a system failure; and control means for, while said data processing system serves as a client system, causing said storage means to store status data indicating whether transaction processing of each of said server systems is completed, and for, while said data processing system serves as a server system, performing data recovery processing on the basis of the status data stored in said storage means by controlling said data recovery processing means when an operation is restarted after a system failure of said server system.

6. A data recovery method of a distributed transaction processing system of a two-phase commit scheme, in which data processing systems serving as server systems are connected to a data processing system serving as a client system through a communication line, and each of said server systems performs PHASE I processing and PHASE II processing in response to transaction processing requests from said client system, comprising the steps of:

(a) holding data indicating whether all said server systems have completed the PHASE I processing;

(b) inquiring of said client system whether all said server systems have completed the PHASE I processing when an operation is restarted after a system failure of said server system; and (c) causing said server system to perform the PHASE II processing when response data with respect to the inquiry indicates that all said server systems have completed the PHASE I processing, and causing said server system to perform rollback processing when the response data indicates that not all said server systems have completed the PHASE I processing.

7. A method according to claim 6, further comprising:

the step of recording an intermediate result of transaction processing in a journal file, the PHASE I processing including the buffer flush out processing step of writing updated data with respect to a transaction file sent from said client system in an external storage file, and the PHASE II processing including the step of deleting journal data stored in said journal file and the step of releasing the updated data.

8. A method according to claim 6, wherein the step (c) includes the step of causing all said server systems to roll back to the PHASE I and execute the PHASE I processing again when the response data with respect to the inquiry indicates that not all said server systems have completed the PHASE I processing.

* * * * *

UNITED STATES PATENT AND TRADEMARK OFFICE
CERTIFICATE OF CORRECTION

PATENT NO. : 5,140,689
DATED : August 18, 1992
INVENTOR(S) : Seiichi Kobayashi It is certified that error appears in the above-identified patent and that said Letters Patent is hereby corrected as shown below:

Claim 5, column 7, line 49, delete the second occurence of "processing".

In the Abstract, line 13, after "termination", insert --,--.

Signed and Sealed this

Sixteenth Day of November, 1993

Attest:

BRUCE LEHMAN

*Attesting Officer*  *Commissioner of Patents and Trademarks*